April 11, 1961 E. G. SCHMIEDING ET AL 2,979,379
EXTRACTION OF URANIUM

Filed April 1, 1958 3 Sheets-Sheet 1

INVENTORS
Earl G. Schmieding
Archie E. Ruehle
BY
Roland A. Anderson
Attorney

April 11, 1961    E. G. SCHMIEDING ET AL    2,979,379
EXTRACTION OF URANIUM
Filed April 1, 1958    3 Sheets-Sheet 2
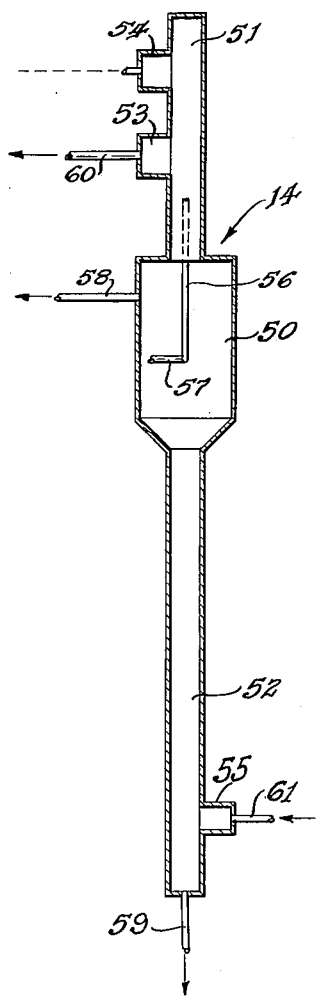
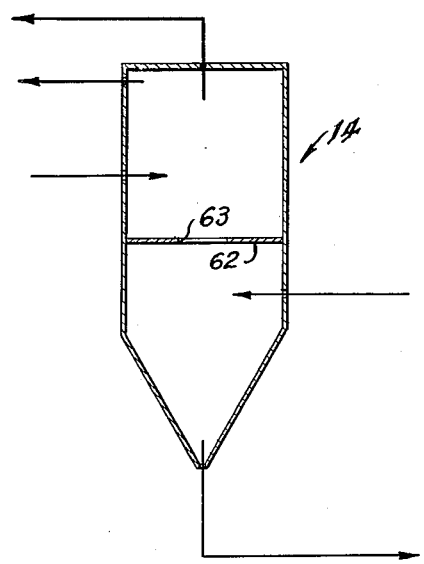
INVENTORS
*Earl G. Schmieding*
*Archie E. Ruehle*
BY
*Roland A. Anderson*
Attorney

United States Patent Office 2,979,379
Patented Apr. 11, 1961

2,979,379

EXTRACTION OF URANIUM

Earl G. Schmieding, Pampa, Tex., and Archie E. Ruehle, Pacific, Mo., assignors to the United States of America as represented by the United States Atomic Energy Commission Filed Apr. 1, 1958, Ser. No. 725,760

8 Claims. (Cl. 23—14.5)

This invention relates to the separation of metal values from aqueous feeds by extraction with an organic extractant. In more detail the invention relates to the extraction of uranium from aqueous feeds thereof by a solution of tributyl phosphate in hexane.

A commercial process for the purification of uranium involves (1) an extraction step for transferring uranyl nitrate from a digested ore solution to a solvent, (2) a wash step in which all materials less extractable than uranyl nitrate are recovered from the solvent by a small volume of water, and (3) a reextraction step for recovering the uranyl nitrate from the solvent. Use of a solution of tributyl phosphate in hexane as this extractant was suggested by James C. Warf in U.S. patent application Serial No. 142,707, now Patent No. 2,848,300, issued August 19, 1958. The process may be employed in the production of uranium metals from ores and in the recovery of uranium from spent fuel elements. This invention relates to the first operation in this process which has the two-fold purpose of quantitatively removing uranium from the aqueous feed and saturating the extract with uranium.

It is accordingly an object of this invention to provide a process by which uranium may be recovered substantially quantitatively from aqueous feeds in a form substantially free of impurities.

It is another object of this invention to provide a high capacity multistage process for the extraction of uranium from aqueous feeds.

It is also an object of the present invention to provide a multistage system for the extraction of uranium.

These and other objects of our invention are accomplished by our novel procedure for extracting uranium from aqueous feeds while preventing the extraction of impurities therefrom comprising passing the aqueous feed through a plurality of pumper-decanter extraction stages in counter-current relationship to an organic extractant, operating the said stages so that a complete phase separation occurs only in the last decanter, and controlling the relative proportion of feed and extractant to obtain a saturated solution of uranium in extractant as product by adjusting the extractant rate in accordance with the density of the extract phase from an intermediate stage. By this procedure a high purity product is obtained in a high capacity system.

The invention will be described in connection with the accompanying drawings wherein Figure 1 represents a flow sheet of the process for the extraction of uranium from aqueous solutions.

Figure 2 represents a schematic view of a decanter employed in pilot plant work;

Figure 3 represents a diagrammatic view of a decanter employed in plant operation;

Figure 1:
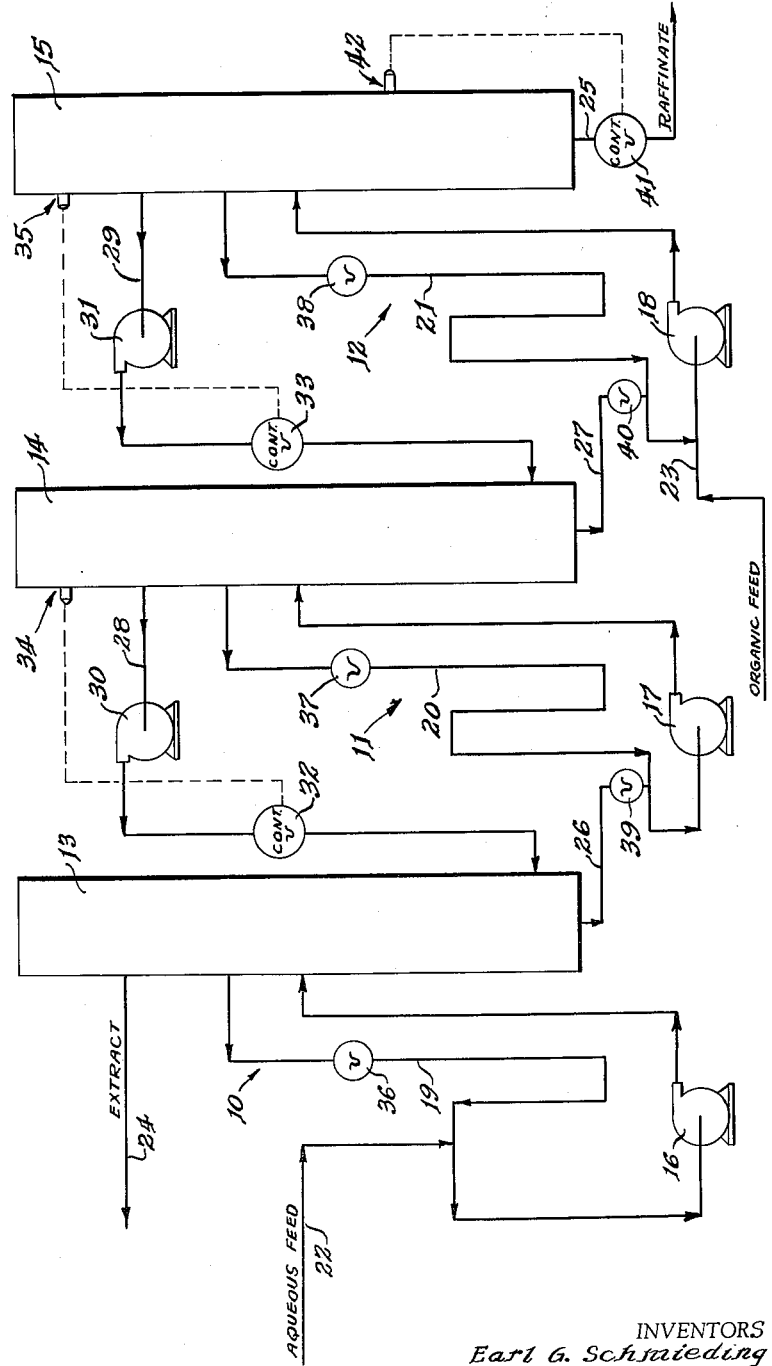
Figure 4:
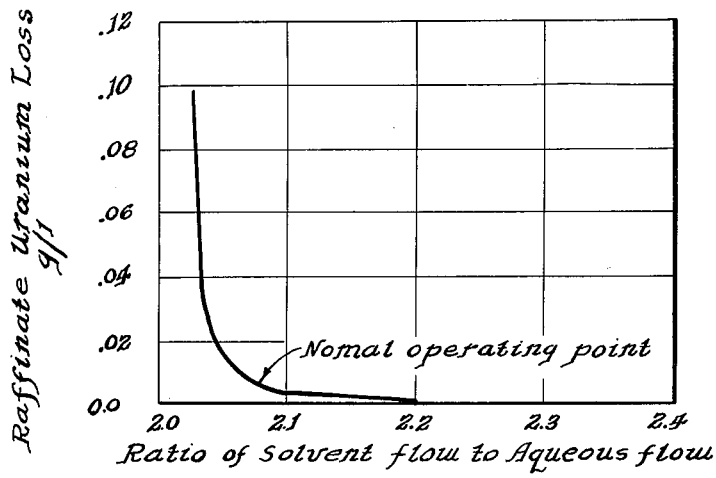
Figure 4 is a graph showing the effect of the ratio of solvent flow to aqueous flow on the raffinate uranium loss.

The system in which our novel process can be carried out will now be described by reference to Figure 1 of the drawing.

The drawing shows a system employing three extraction stages denoted by the numerals 10, 11 and 12 respectively, each stage including a decanter 13, 14 and 15 respectively, and a pump 16, 17 and 18 respectively. It will be understood that, although Figure 1 shows a three-stage system, any number of stages can be employed to obtain some of the advantages of the present invention. It has been found that four or five stages are most satisfactory for the extraction of uranuim as described hereinafter.

Decanters 13 to 15 are described in detail hereinafter and may be either of the types shown in Figure 2 or 3. The pumps 16 to 18 may be conventional centrifugal mixing pumps.

Pumps 16 to 18 are contained within recycle lines 19 to 21 respectively and serve to withdraw solvent from decanters 13 and 15 and return it to the same decanter at a lower point through the said recycle lines.

Aqueous feed line 22 is connected into recycle line 19 of the first stage 10 and organic feed line 23 is connected into recycle line 21 of the last stage 12. Extract line 24 is provided to remove the organic phase from the first decanter 13 and raffinate line 25 is provided to remove the aqueous phase from the last decanter 15.

Raffinate lines 26 and 27 connect the bottom of decanters 13 and 14 with recycle lines 20 and 21 of the next succeeding stage and extract lines 28 and 29, including pumps 30 and 31 therein, connect the top of decanters 14 and 15 with the next preceding stage at the bottom of decanters 13 and 14 respectively. Extract lines 28 and 29 also include valves 32 and 33 controlled by floats at 34 and 35.

Recycle lines 19, 20 and 21 each include a valve 36, 37 and 38; likewise raffinate lines 26 and 27 include valves 39 and 40; and raffinate line 25 includes a valve 41 controlled by an interface float located at 42 in the last decanter 15.

Operation of the system is as follows: Aqueous feed is fed into the system through aqueous feed line 22. The feed is pulled into recycle line 19 by operation of pump 16. The aqueous phase successively passes through pump 16, falls through decanter 13, passes through pump 17, falls through decanter 14, passes through pump 18, and falls through decanter 15 where it collects as raffinate at the bottom of the decanter. Decanter 15 is operated so that substantially complete phase separation occurs. Discharge of raffinate from decanter 15 is by gravity through control valve 41 regulated by an interface float located in decanter 15 at 42, thereby preventing discharge of the continuous organic phase from decanter 15.

Organic feed is introduced into recycle line 21 on the suction side of pump 18. The solvent passes through pump 18, up and out the top of decanter 15 to the bottom of decanter 14, up and out the top of decanter 14 to the bottom of decanter 13, and up and out the top of decanter 13. The solvent is pumped from decanter 15 to decanter 14 and from decanter 14 to decanter 13 by centrifugal pumps 30 and 31. Discharge from these pumps is regulated by control valves 32 and 33 operated from floats resting on the top of the organic phase at 34 and 35 in decanters 14 and 15 thereby preventing pump starving.

The invention is concerned primarily with the extraction of uranium. The aqueous feed, therefore, consists of a slurry or solution of $UO_2(NO_3)_2$ preferably carrying around 200 grams per liter of uranium although the control system described hereinafter takes in stride variations over the range of 150 to 250 grams per liter. The preferred extractant consists of a 28% solution of tributyl phosphate in hexane. The abbreviation TBT is employed for the compound tributyl phosphate. The extraction depends on the formation of a strong complex between the nitrate and the tributyl phosphate of composition $UO_2(NO_3)_2 \cdot 2$ TBP. Many other inorganic salts also may be extracted by forming complexes with TBP but the resulting distribution coefficients between the solvent and the aqueous phase are less favorable for extraction than with uranyl nitrate.

One of the important features of the invention is that only the last decanter is operated in such a fashion that complete phase separation occurs. Both decanters 13 and 14 and the decanters of any additional stages included in the system are operated so that only a partial phase separation occurs. The content of decanters 13 and 14 varies from substantially pure organic phase at the top of the decanter to a mixture of organic and aqueous at the bottom. More solvent is pumped from the top of decanters 14 and 15 to the bottom of the preceding decanters than is required for upward flow through the decanters. The excess recycles out from the bottom of these decanters through raffinate lines 26 and 27. Thus this portion of the solvent serves as a secondary recycle flushing aqueous out of the bottom of the decanters thereby preventing formation of a continuous aqueous layer.

In order to reduce the possibility that the solvent flows directly up through the decanter bypassing the mixture system entirely, it is desirable to employ a high solvent to aqueous recycle ratio. When the term solvent recycle ratio is used herein it refers to the ratio of the rate of the solvent being recycled including that recycled directly through the recycle line and that recycled through the preceding decanter to the rate of aqueous feed passing through the system. The desired ratio may be obtained very easily by adjusting valves 36, 37 and 38 in the recycle lines 19, 20 and 21 and the valves 39 and 40 in raffinate lines 26 and 27.

By employing a discontinuous aqueous phase in all but the last decanter it is found that the equipment is simplified by the elimination of interface control and associated valves from all but the last decanter and at the same time it is found that the capacity and efficiency of the system is increased.

Another important feature of the invention resides in operating the system so that the extract solution is loaded with as much uranyl nitrate as possible. This reduces the concentration of organic solvent available for extracting other salts. It has been found that uranium is more soluble in the extractant than are the impurities so that saturation of the solvent with uranium will prevent the extractant from taking up impurities. Thus uranium in extremely pure form can be obtained from this process.

A substantially saturated solution of uranium in extractant is obtained by controlling the relative proportion of aqueous feed to organic feed coupled with thorough mixing of aqueous and organic. The need for a high solvent recycle ratio to assure thorough mixing is thereby enhanced. It has been found that satisfactory control can be achieved by holding the aqueous feed rate constant and varying the solvent feed rate to hold the uranium concentration constant somewhere within the system.

The uranium concentration in any of the decanter extract streams can be determined very simply since the density of the stream, although somewhat affected by solvent concentrations and temperature, is primarily affected by uranium concentration. Density tests can be carried out on these extract streams periodically or continuously by conventional techniques. It has been found that the point of maximum sensitivity is at about the central stage. Therefore, for a three-stage system the extract stream from the second decanter should be used and for a five-stage system the extract stream from the third decanter should be used. It is therefore merely necessary that the density of this stream be held as constant as possible.

A number of tests have been carried out to demonstrate the efficiency and capacity of the system. A three-stage system employing the decanter shown in Figure 2 was employed for the first tests. As shown in this figure the decanter comprises a main body 50 formed of stainless steel, connected at the top and bottom to glass pipes 51 and 52 respectively. Decanter 14 will be described in detail.

The main body 50 of decanter 14 is 12 inches in diameter and 36 inches long. Glass pipe 51 is 4 inches in diameter and 12 inches in length and is topped by two glass T arms 53 and 54. This is the pipe which is connected to the top of decanters 14 and 15. The pipe connected to the top of decanter 13 is similar but is 36 inches in length and has but one glass T arm. Glass pipe 52 is 4 inches in diameter, 36 inches in length, and provided with a single glass T arm 55. All decanters are provided with this same pipe.

As shown, the feed pipe 56 from recycle line 20 enters the top of the main body 50 of the decanter 14, about an inch from the wall thereof and extends downwardly into the decanter terminating in a horizontal nozzle 57 so arranged that the feed is sprayed into the decanter horizontally tangential to the wall. Outlet pipe 58 likewise connects with recycle line 20. Raffinate outlet pipe 59 connects with raffinate line 27 leading to recycle line 21, extract outlet pipe 60 connects with extract line 28 through T arm 53, while extract inlet pipe 61 connects with extract line 29 through T arm 55. Float control for valve 32 operates through T arm 54.

A number of runs were carried out on different feeds. A description of the feeds follows:

TABLE I

*Description of feeds*

| Run No. | Name of Feed | Fee Type | Approx. U Assay, percent | Special Characteristics |
|---|---|---|---|---|
| H66 | Anaconda | Colorado Soda Salt | 63 | High vanadium (5-10%) |
| H67 | Beaver Lodge | Canadian Soda Salt | 61 | High rare earth content |
| H68 | Durango | Colorado Black Oxide | 75 | |
| H71 | Rand | South African Ion Exchange Product | 72 | High sulphate |
| H72 | Uravan | Colorado Soda Salt | 70 | Moderately high vanadium, sulphate, and insolubles |

The aqueous feeds were obtained by digesting feed materials in nitric acid to give a slurry containing approximately 200 g. uranium per liter and 3 N excess $HNO_3$. The feed was at a rate of 25 gallons per hour. The organic rate was adjusted at 10-minute intervals on the basis of the density of middle decanter extract samples, the object being to hold the extract uranium level at about 36 g. liter. The organic feed to the decanters was 24-30% TBP in hexane. The solvent to aqueous flow ratio averaged slightly over 2. The net solvent to aqueous recycle ratio was about 10 : 1. In general, the physical operation of the pilot plant pumper-decanters was very satisfactory. No difficulties were encountered with emulsification or excessive entrainment of aqueous in the solvent. Results follow:

TABLE II

*Three unit pumper-decanter results*

| Run No. | Feed | Average U Conc. in Raffinate, g./l. | Average U Conc. in Extract, percent of theoretical maximum [a] |
|---|---|---|---|
| H66 | Anaconda | 0.42 | 86.3 |
| H67 | Beaver Lodge | 0.10 | 79.2 |
| H68 | Durango | 0.21 | 91.0 |
| H71 | Rand | 0.49 | 93.3 |
| H72 | Uravan | 0.53 | 93.2 |
| Average for pilot plant | | 0.35 | 88.6 |

[a] The theoretical maximum uranium loading in the solvent corresponds to equilibrium with the aqueous feed.

The above tests were carried out with the system arranged as described so that only in the last decanter was there complete phase separation. As only 3 stages are employed complete saturation of the extractant with uranyl nitrate was not attained. These and other tests indicated that the described system and method of operation thereof was a great improvement over a system in which complete phase separation occurred in all decanters. By our novel method and apparatus the capacity of the system was increased and uranium losses were reduced. As compared with the average loss of .35 g./l. in Table II, losses by the prior method averaged 1.2 g./l. Prior to the change the maximum aqueous feed rate which could be used was 30 g.p.h. whereas after the change the plant has been operated at rates up to 50 g.p.h.

The increase in efficiency apparently comes from the counter-current extraction effect obtained in the decanters and the increase in capacity from the fact that the mixture does not separate into distinct phases in most of the decanters.

An extended feed test run was made to investigate uranium recovery and purity of the product of the pilot plant TBP-hexane extraction cycle operating on a series of different feed materials. In the remainder of the tests herein described a fourth pumper-decanter stage was added to the system to simulate more closely the preferred plant operation. The feeds tested are listed and described in the following table:

TABLE III

*Description of feeds*

| Name of Feed | Feed Type | Approximate Uranium Assay, Percent | Special Characteristics |
|---|---|---|---|
| Galigher | Colorado Black Oxide | 50 | |
| Uravan | Colorado Soda Salt | 70 | Moderately High V, SO4, Insolubles. |
| Durango | Colorado Black Oxide | 75 | High Quality Black Oxide. |
| Kerr-McGee | Colorado Soda Salt | 70 | High Iron. |
| Naturita | Colorado Black Oxide | 70 | High Quality Black Oxide. |

The solvent was 25–28% TBP in hexane. Its feed rate was adjusted at ten-minute intervals on the basis of the density of the extract from the third decanter. The organic to aqueous recycle ratio was 10 : 1. This recycle ratio was obtained by adjusting the system to give a 5 : 1 organic to aqueous ratio in the streams leaving the bottoms of the decanters and the same ratio in the recycle lines. Since only the aqueous coming from the bottom of the decanters was passing through the system, the net recycle ratio was 10 : 1. Results follow:

TABLE IV

| Run | Feed | Uranium Concentration | | | |
|---|---|---|---|---|---|
| | | Aqueous Feed, g./l. | Third Decanter Extract | Raffinate | Yield |
| H21A | Galigher | 209 | 55 | 1.0 | 99.52 |
| H22A | Uravan | 196 | 50 | 1.2 | 99.39 |
| H23A | Durango | 186 | 52 | 0.80 | 99.57 |
| H25A | Kerr-McGee | 172 | 57 | 0.21 | 99.88 |
| H27A | Naturita | 204 | 51 | 0.58 | 99.72 |
| Pilot Plant Average | 193 | | 53 | 0.76 | 99.62 |

A series of pumper-decanter runs were made to study the effects of recycle rate on performance.

The runs were made on Anaconda feed slurries containing about 200 g. U/l. and 1.5 lb./gal. excess $HNO_3$. An aqueous feed rate of 25 g.p.h. was used. Density control of the second decanter extract was used. The amount of recycle was varied in two ways: (1) by changing solvent rate through the recycle rotometers; and (2) by changing the organic aqueous ratio in the streams leaving the bottom of the decanters. Test results follow:

TABLE V

*Pumper-decanter data from recycle test runs*

| Run No. | Uranium Concentration | | |
|---|---|---|---|
| | Aqueous Feed, g./l. | 2nd Decanter, Extract, g./l. | 4th Decanter Raffinate, g./l. |
| R2 | 184 | 47 | 0.17 |
| R3 | 163 | 50 | 0.51 |
| R5 | 202 | 53 | 0.23 |
| R6 | 183 | 53 | 1.2 |
| R7 | 180 | 54 | 0.52 |
| R8 | 179 | 55 | 0.20 |
| R9 | 186 | 45 | 0.11 |
| R10 | 187 | 54 | 0.13 |
| R13 | 153 | 52 | 0.10 |

The effect of recycle on performance of the first decanter is shown in the next table.

The column headed "Number of Theo. Stages" represents the computed equivalent of the stage as obtained from experimental values.

TABLE VI

*Effect of recycle on performance of the first decanter*

| Run No. | Recycle, organic: aqueous | Number of Theo. Stages | Saturation, Percent |
|---|---|---|---|
| R8 | 9 | 2.00 | 99 |
| R9 | 9 | 1.93 | 94 |
| R10 | 9 | 1.68 | 93.5 |
| R13 | 9 | 1.92 | 93.5 |
| R2 | 8.5 | 2.00 | 96 |
| R3 | 7 | 1.28 | 86.5 |
| R5 | 7 | 1.93 | 96 |
| R6 | 5.5 | 1.07 | 82 |
| R7 | 4 | 1.18 | 85.5 |

It is thus evident that the efficiency of the first decanter was increased by increasing the recycle ratio.

The efficiency of the remaining decanters and of the total system as a function of recycle ratio is illustrated by the following table:

TABLE VII

*Effect of recycle on performance of the second, third and fourth decanters*

| Run No. | Recycle, organic: aqueous | Raffinate Ratio, organic: aqueous | Total Recycle, organic: aqueous | Number of Theoretical stages | | | Total Number of Theoretical Stages |
|---|---|---|---|---|---|---|---|
| | | | | D-2 | D-3 | D-4 | |
| R8 | 8 | 5 | 13 | 1.00 | 0.16 | 0.48 | 3.7 |
| R13 | 5 | 5 | 10 | 0.80 | .43 | .87 | 4.0 |
| R5 | 2 | 5 | 7 | .79 | .54 | .51 | 3.8 |
| R9 | 8 | 3.5 | 11.5 | .82 | .19 | .83 | 3.7 |
| R2 | 5 | 3.5 | 8.5 | .75 | .54 | .50 | 3.7 |
| R6 | 2 | 3.5 | 5.5 | .54 | .61 | .43 | 2.5 |
| R10 | 8 | 2 | 10 | .92 | .34 | .75 | 3.7 |
| R3 | 5 | 2 | 7 | .93 | .32 | .15 | 2.7 |
| R7 | 2 | 2 | 4 | .66 | .59 | .68 | 3.2 |

It is evident that the efficiency of the second decanter increased slightly while the efficiency of the third decanter decreased slightly as the ratio was increased. As far as the total system is concerned it is evident that a recycle ratio of between about 7 and 13 is required for optimum efficiency.

Although four stages are sufficient for the commercial extraction of uranium according to the procedure here outlined, five stages are preferable for safety. As is evident from the above it is necessary that the recycle ratio be held within a range of about 20% of 10:1. For optimum purity the recycle ratio may be doubled to 20:1 at the expense of a decrease in efficiency of the system. The increase in purity is about that obtained by increasing the number of stages to 6 retaining the same recycle ratio. Addition of more stages or a further increase in recycle ratio has little effect.

Performance of the system is extremely sensitive to the ratio of the solvent flow to aqueous flow. The solvent flow must be maintained so as to just provide enough solvent for complete saturation of the extract with uranyl nitrate since an excess or a deficiency in solvent flow results in less satisfactory results.

Figure 5:
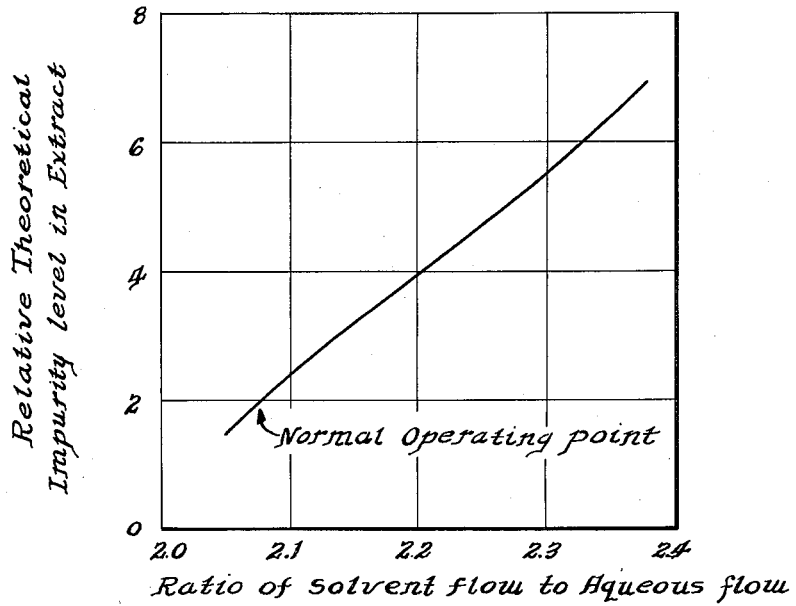
Figure 5 is a graph showing the effect of the ratio of solvent flow to aqueous flow on the theoretical impurity level in the extract.

Figures 5 and 6 are curves illustrating these effects. It is apparent from Figure 5 that a slight deficiency in solvent flow results in a tremendous increase in uranium losses. Likewise Figure 6 shows that excess solvent flow causes a decided increase in the contamination of the extract. It is for this reason that it is so important to control the relative flow of solvent to aqueous feed as has already been described. As shown in these figures, the normal operating point is a ratio of 2.08 parts solvent to 1 part aqueous.

Finally, the decanter to be used in plant operation will be described. This decanter is diagrammatically illustrated in Fig. 3 of the drawing. The decanter is divided into two parts by a plate 62 containing an orifice 63 of diameter approximately one-third of the decanter itself. The plate containing the orifice reduces the chances for the organic phase to backflow from the top to the bottom of the decanter by reducing the effect of the stirring action of mixed phase flow inlet flow in causing turbulence in the lower part of the decanter, and by increasing the "sealing" action of the upward solvent flow by increasing its velocity. With this arrangement extractive action occurs in the recycle line on the discharge side of the mixing pump and in the lower part of the decanter itself as the aqueous phase falls downward.

It will be understood that this invention is not to be limited to the details given herein but that it may be modified within the scope of the appended claims.

What is claimed is:

1. A method of extracting metal values from an aqueous feed containing said values comprising passing said aqueous feed through a plurality of stages, each including a mixing zone and a decanting zone, in counter-current relationship to an organic extractant by introducing said aqueous feed into the mixing zone of the first stage, mixing with a portion of the mixture contained in the first decanting zone and passing the mixture thereof to the said first decanting zone; introducing said organic extractant into the mixing zone of the last stage, mixing with the raffinate obtained from the preceding stage and a portion of the mixture contained in the last decanting zone, and passing the mixture thereof to the last decanting zone whereby a phase separation occurs in the last decanting zone; introducing the raffinate obtained from intermediate stages into the mixing zone of the next succeeding stage, mixing with the mixture contained in the decanting zone of the said succeeding stage, and passing the mixture thereof to the said succeeding stage; passing the extract phase from each stage to the bottom of the decanting zone of the next preceding stage at a greater rate than it can rise to the top of the decanter whereby a complete phase separation does not occur; and recovering the extract phase from the first stage and the raffinate phase from the last stage.

2. Method according to claim 1 wherein the feed contains 200 g./l. uranium.

3. Method according to claim 2 wherein the extractant is a 25–30% solution of tributyl phosphate in hexane.

4. Method according to claim 3 wherein the organic to aqueous recycle ratio is at least 10 to 1.

5. Method according to claim 4 wherein the extractant to feed ratio is 2.08.

6. In a method of extracting metal values from an aqueous feed containing said values wherein said aqueous feed is passed through at least a first decanting zone and a second decanting zone countercurrent to an organic extractant, and wherein a portion of the mixture contained in each decanting zone is recycled through a mixing zone associated therewith, the improvement comprising passing more solvent from the top of the second decanting zone to the bottom of the first decanting zone than can rise to the top thereof, and recycling that portion of the solvent that does not rise to the top of the first decanting zone back to the second decanting zone through the mixing zone associated with the second decanting zone in admixture with aqueous phase.

7. A method according to claim 6 in which the metal is uranium and the solvent is a 25–30% solution of tributyl phosphate in hexane.

8. A method according to claim 7 wherein the organic to aqueous recycle ratio is between 7 to 1 and 13 to 1.

References Cited in the file of this patent

UNITED STATES PATENTS 2,848,300    Warf _____ Aug. 19, 1958

OTHER REFERENCES

ORNL-2025, February 155, pp. 2 and 20–27. (Copy in Scientific Library.)

Davis et al.: Chem. Eng. Progress, April 1954, pp. 188–197. (Copy in Scientific Library.)